United States Patent
Hou (10) Patent No.: US 9,642,158 B2
(45) Date of Patent: May 2, 2017

(54) SCHEDULING METHOD AND DEVICE (71) Applicant: MStar Semiconductor, Inc., Hsinchu Hsien (TW)

(72) Inventor: Hai-Yan Hou, Shanghai (CN)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 49 days.

(21) Appl. No.: 14/719,404

(22) Filed: May 22, 2015

(65) Prior Publication Data

US 2015/0351120 A1 Dec. 3, 2015

(30) Foreign Application Priority Data

May 27, 2014 (CN) .......................... 2014 1 0228818

(51) Int. Cl.
*H04W 72/12* (2009.01)
*H04W 72/04* (2009.01)
*H04J 1/00* (2006.01)
*H04W 40/02* (2009.01)

(52) U.S. Cl.
CPC .......... *H04W 72/1278* (2013.01); *H04J 1/00* (2013.01); *H04W 40/02* (2013.01); *H04W 72/0446* (2013.01)

(58) Field of Classification Search
CPC ......... H04W 72/1278; H04W 72/0446; H04W 40/02; H04J 1/00
USPC ....................................................... 370/336
See application file for complete search history.

(56) References Cited

U.S. PATENT DOCUMENTS

2013/0244647 A1* 9/2013 Makh .................... H04W 48/16
455/434

FOREIGN PATENT DOCUMENTS

| CN | 1988414 B | 5/2010 |
| CN | 101415189 B | 12/2011 |
| CN | 102421131 A | 4/2012 |

OTHER PUBLICATIONS

Taiwan Patent Office "Office Action" issued on Jan. 21, 2016, Taiwan.

* cited by examiner

*Primary Examiner* — Jamal Javaid
(74) *Attorney, Agent, or Firm* — WPAT, PC; Justin King; Jonathan Chiang (57) ABSTRACT

A scheduling method includes: determining whether a valid time interval is shorter than a first time interval; and when the valid time interval is smaller than the first time interval, performing a search for a time length of N predetermined search cycles. In each of the predetermined search cycles, N consecutive TD-SCDMA sub-frames are regarded as a group, and one fixed sub-frame in the group is selected for the search. In the N predetermined search cycles, the fixed sub-frames selected from the group in respective predetermined search cycles are different. N is a natural number greater than or equal to 2.

10 Claims, 7 Drawing Sheets

SCHEDULING METHOD AND DEVICE

This application claims the benefit of People's Republic of China application Serial No. 201410228818.9, filed May 27, 2014, the subject matter of which is incorporated herein by reference.

BACKGROUND OF THE INVENTION

Field of the Invention

The invention relates in general to a communication technology, and more particularly to a scheduling method and device.

Description of the Related Art

A Third Generation (3G) mobile communication system usually needs to switch among systems of different standards. Particularly in the next few years, the Second Generation (2G) system having broader coverage, e.g., Global System of Mobile communication (GSM), will coexist with the new 3G system that is targeted at solving high communication volumes in metropolitan areas. This will cause enormous amounts of switching among systems, resulting in larger demands in high frequency switching. The foundation of switching is that, a user equipment (UE) needs to routinely monitor surrounding regions to constantly obtain the power of received signals (a certain Base Transceiver Station (BTS)) and updates of a list of these BTSs from the surrounding GSM BTSs. Further, analog detection of Time Division-Synchronous Code Division Multiple Access (TD-SCDMA) BTSs also need to be simultaneously carried out.

The length of one TD-SCDMA sub-frame is 5 ms, and includes 7 general timeslots and 3 special timeslots. The 7 general timeslots are $T_s0 \sim T_s6$, each having a routine timeslot length of 675 μs. More specifically, the 3 special timeslots include a Down Pilot Timeslot (DwPTS) having a length of 75 μs, a Guard Period (GP) having a length of 75 μs, and an Up Pilot Timeslot (UpPTS) having a length of 125 μs. The timeslot $T_s0$ and the 3 special timeslots may be utilized as broadcasting timeslots used for detecting information of surrounding BTSs.

The length of one GSM frame is 60/13 ms, and includes 8 timeslots each having a length of 15/26 ms. 51 Time Division Multiple Access (TDMA) frames from form one composite frame, 26 composite frames form a super frame, and 2048 super frames form an ultra frame. In the GSM system, the Frequency Correction Channel (FCCH)/Synchronization Channel (SCH) information in composite frames for controlling synchronization occurs in the timeslot $T_s0$ of the $0^{th}$, $10^{th}$, $20^{th}$, $30^{th}$ and $40^{th}$ TDMA frames. The $50^{th}$ frame at the end is an idle frame, which does not include any information to indicate the end of the composite frame.

Figure 1:
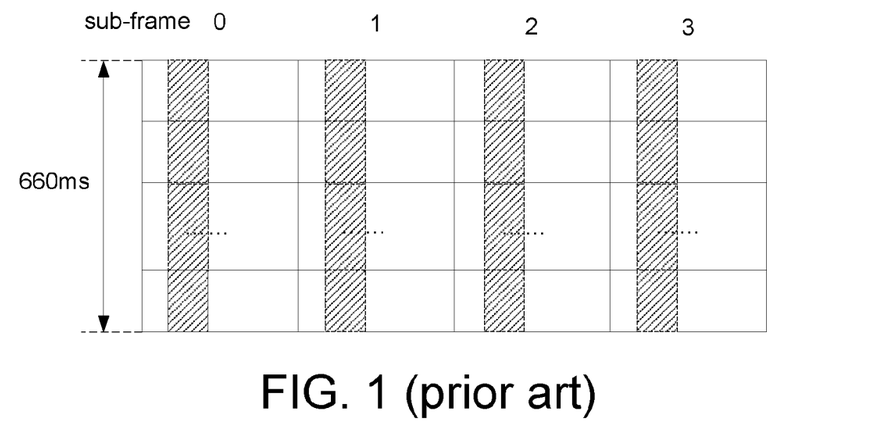
FIG. 1 is a schematic diagram of a conventional TD-SCMDA system scheduling GSM measurement.

FIG. 1 shows a schematic diagram of a conventional TD-SCMDA system scheduling a UE for GSM measurement. To obtain information of the GSM system under the architecture of TD-SCDMA frames, "An Efficient monitoring strategy for intersystem handover from TD-SCDMA to GSM networks" (G. Durastante and A. Zanella, in Proc. Of IEEE PIMRC'02, vol 4, pp. 1555-1560, 2002) provides a measuring method. As shown in FIG. 1, a time interval at a fixed position (the shaded part) is provided in each of the TD-SCDMA sub-frames. The time interval is greater than or equal to 25/26 ms (5/12 ms+the length of one GSM timeslot), and is utilized for searching for the GSM FCCH, so as to ascertain that at least one FCCH falls in the time interval within 660 ms to further guarantee that the FCCH can be identified within 660 ms.

Figure 2:
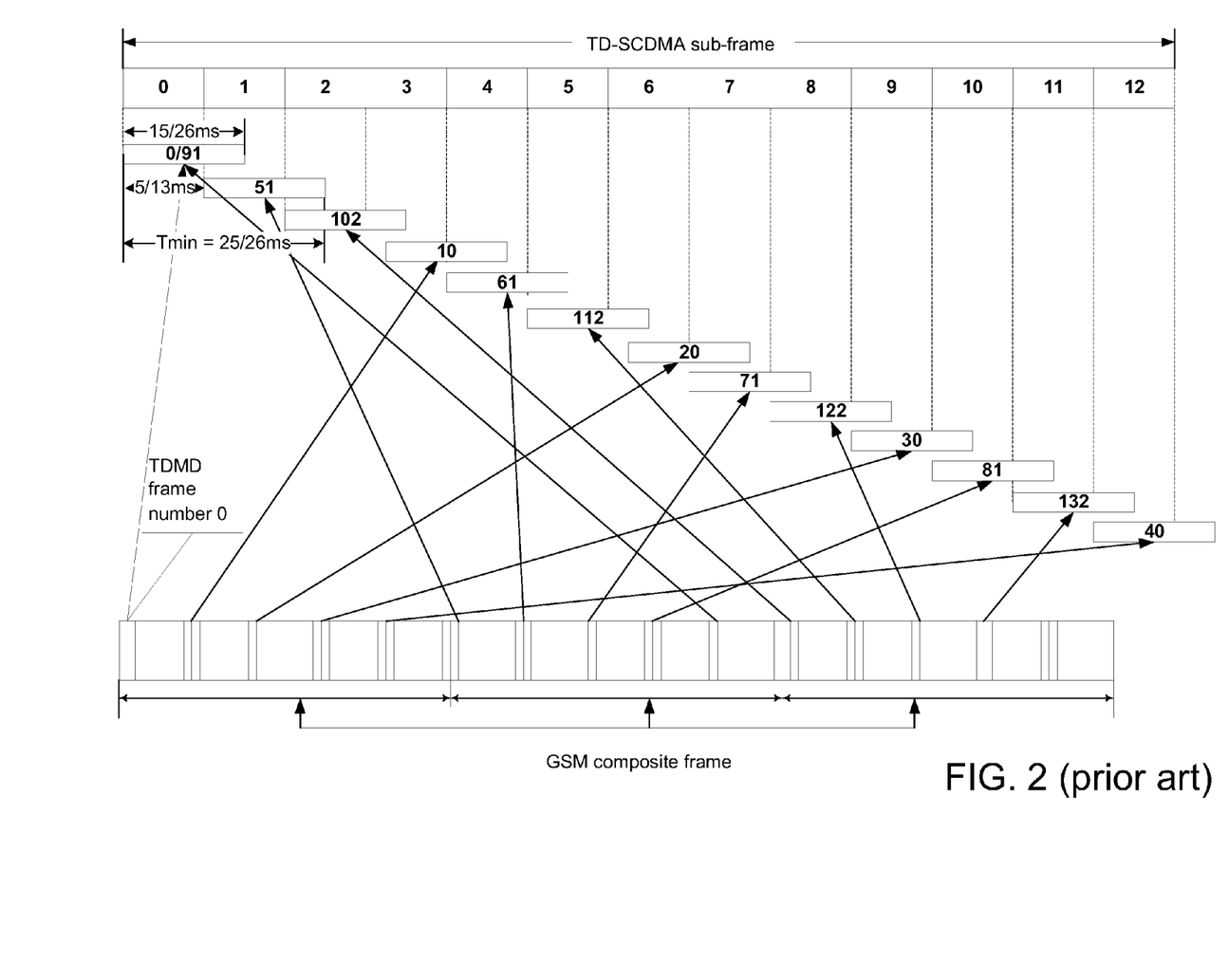
FIG. 2 is a schematic diagram of searching for FCCH/SCH information by adopting the measurement method in FIG. 1.

FIG. 2 shows a schematic diagram of searching FCCH/SCH information by adopting the measurement method in FIG. 1. As the length of each TD-SCMDA sub-frame is 5 ms and one GSM TDMA frame is 60/13 ms, the position of the FCCH/SCH information of each GSM TDMA frame relative to the position of one TD-SCDMA sub-frame shifts as time passes. After the length of each GSM TDMA frame, the relative position shifts by (5−60/12)ms=5/13 ms, meaning that one 5 ms TD-SCDMA sub-frame has 13 shift positions. That is to say, the GSM TDMA frame covers the entire 5 ms TD-SCDMA sub-frame after 13 shifts, and cyclically shifts accordingly. Combining the positions where the FCCH/SCH information appears, the FCCH/SCH information occurs once in every 10 TDMA frames of the frames in one GSM composite frame. For example, the $1^{st}$ FCCH/SCH (TDMA frame 0 in the GSM composite frame) occurs at the position 3 in the TD-SCDMA sub-frames, the $2^{nd}$ FCCH/SCH (TDMA frame 10 in the GSM composite frame) occurs at the position 3, and so forth. After 13 times, it can be ensured that the FCCH/SCH information of the $0^{th}$ frame $T_s0$ of GSM TDMA frames is obtained. Thus, after 660 ms (i.e., 132 consecutive TD-SCDMA sub-frames), it is ascertained that all 13 positions are covered to further guarantee that the FCCH/SCH is successfully identified.

However, for the TD-SCDMA system, in a connection state, the valid time intervals for searching for the GSM FCCH are usually at positions of $T_s0$, DwPTS, GP and UpPTS. Since the UE needs to perform transceiving of many channels, in addition to performing the FCCH/SCH searching that the GSM measurement requires, the measurement of homogeneous-frequency and heterogeneous-frequency neighboring regions of the TD-SCDMA as well as GSM RSSI measurement also need to be performed during these time intervals. Further, the cycle standards of the above measurement have strict requirements. For example, the TD-SCDMA homogeneous-frequency measurement has a cycle of 200 ms, whereas the TD-SCDMA heterogeneous-frequency measurement has a cycle of 480 ms. Consequently, the above consecutive 660 ms may fail to guarantee a successful FCCH search, indicating that the above measurement is infeasible in actual applications.

SUMMARY OF THE INVENTION

The invention is directed to a scheduling method and device that satisfies only all kinds of TD-SCDMA measurement but also GSM system initialization synchronization within a predetermined search cycle.

According to an aspect of the present invention, the present invention provides a scheduling method. The scheduling method includes: determining whether a valid time interval is smaller than a first time interval, the first time interval being at least a sum of a difference between a length of one TD-SCDMA sub-frame and a length of one TDMA frame and a length of a GSM timeslot; when the valid time interval is smaller than the first time interval, performing a search for a time length of N predetermined search cycles. In each of the predetermined search cycles, N consecutive TD-SCDMA sub-frames are regarded as one group, and a fixed sub-frame in the group is selected for the search. Further, in the N predetermined search cycles, the fixed sub-frames selected in respective predetermined search cycles are different, and N is a natural number greater than or equal to 2.

The present invention further provides a scheduling device including a determining module and a control module. The determining module determines whether a valid time interval is smaller than a first time interval. The first time interval is a sum of a difference between a length of one TD-SCDMA sub-frame and a length of one TDMA frame and a length of a GSM timeslot. The determining module further sends the determination result to the control module. The control module receives the determination result, and performs a search for a time length of N predetermined search cycles when the valid time interval is smaller than the first time interval. In each of the predetermined search cycles, the control module regards N consecutive TD-SCDMA sub-frames as one group, and selects a fixed sub-frame in the group for the search. Further, in the N predetermined search cycles, the fixed sub-frames selected in respective predetermined search cycles are different, and N is a natural number greater than or equal to 2.

The present invention provides following features. Distinguished from the prior art, in the present invention, by employing the repetition property in the structure of TD-SCDMA frames, it is determined whether the valid time interval is smaller than the first time interval at the fixed position. When the valid time interval is smaller than the first time interval at the fixed position, N consecutive TD-SCDMA sub-frames in a predetermined search cycle are regarded as one group, and N different fixed sub-frames are selected from the respectively N predetermined search cycles for scheduling to search for Frequency Correction Channel (FCCH)/Synchronization Channel (SCH) information. Thus, GSM initialization synchronization is completed to further satisfy scheduling time requirements of the standard for different tasks.

The above and other aspects of the invention will become better understood with regard to the following detailed description of the preferred but non-limiting embodiments. The following description is made with reference to the accompanying drawings.

DETAILED DESCRIPTION OF THE INVENTION

Details of embodiments are given below with reference to the accompanying drawings.

According to current GSM measuring methods, in order implement GSM initialization synchronization in a TD-SCDMA mode for a user equipment (UE), it needs to be ensured that the time interval for GSM measurement is greater than or equal to 25/26 ms and the search cycle is greater than or equal to 660 ms. As such, it can then be ascertained that the search cycle completely covers 13 shift positions of one 5 ms TD-SCDMA sub-frame to further guarantee a successful search for the FFCH information or the SCH information.

Figure 3:
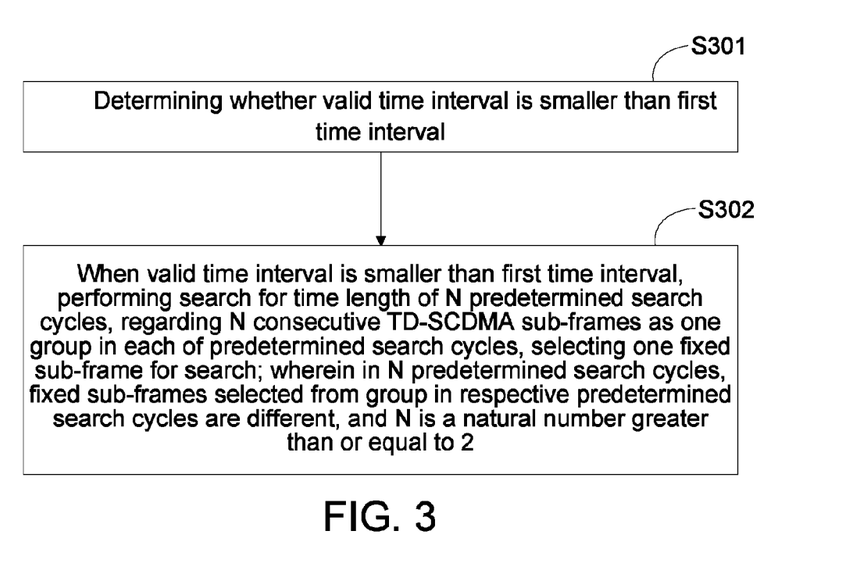
FIG. 3 is a flowchart of a scheduling method according to an embodiment of the present invention.

FIG. 3 shows a flowchart of a scheduling method according to an embodiment of the present invention. In the embodiment, a UE of TD-SCDMA system scheduling GSM measurement is described as an example for illustrating the present invention. The scheduling method according to the embodiment includes following steps.

In step S301, it is determined whether a valid time interval is smaller than a first time interval. The first time interval is at least a sum of a difference between a length of one TD-SCDMA sub-frame and a length of one TDMA frame and a length of a GSM timeslot.

When the UE is in a TD-SCDMA mode, the UE determines whether the valid actual time interval for the GSM measurement is smaller than the first time interval. The first time interval is at least a sum of a difference between a length of one TD-SCDMA sub-frame and a length of one TDMA frame and a length of a GSM timeslot. In the embodiment, the first time interval is at least 25/26 ms=5 ms−60/13 ms+15/26 ms.

In step S302, when the valid time interval is smaller than the first time interval, a search is performed for a time length of N predetermined search cycles. In each of the predetermined search cycles, N consecutive TD-SCDMA sub-frames are regarded as one group, and one fixed sub-frame is selected from the group for the search. In the N predetermined search cycles, the fixed sub-frames selected from the group in respectively predetermined search cycles are different. N is a natural number greater than or equal to 2.

When the valid time interval for the GSM measurement is smaller than the first time interval, the UE performs a search for a time length of N predetermined search cycles. In each of the predetermined search cycles, the UE regards N consecutive TD-SCDMA sub-frames as one group, and selects a fixed sub-frame from the group for the search. Further, in the N predetermined search cycles, the fixed frames selected from the group in the respectively predetermined search cycles are different, thereby completing the GSM initialization synchronization in the TD-SCDMA mode. Wherein, N is greater than or equal to 2, and the predetermined search cycle is 660 ms or an integral multiple of 660 ms.

Figure 4:
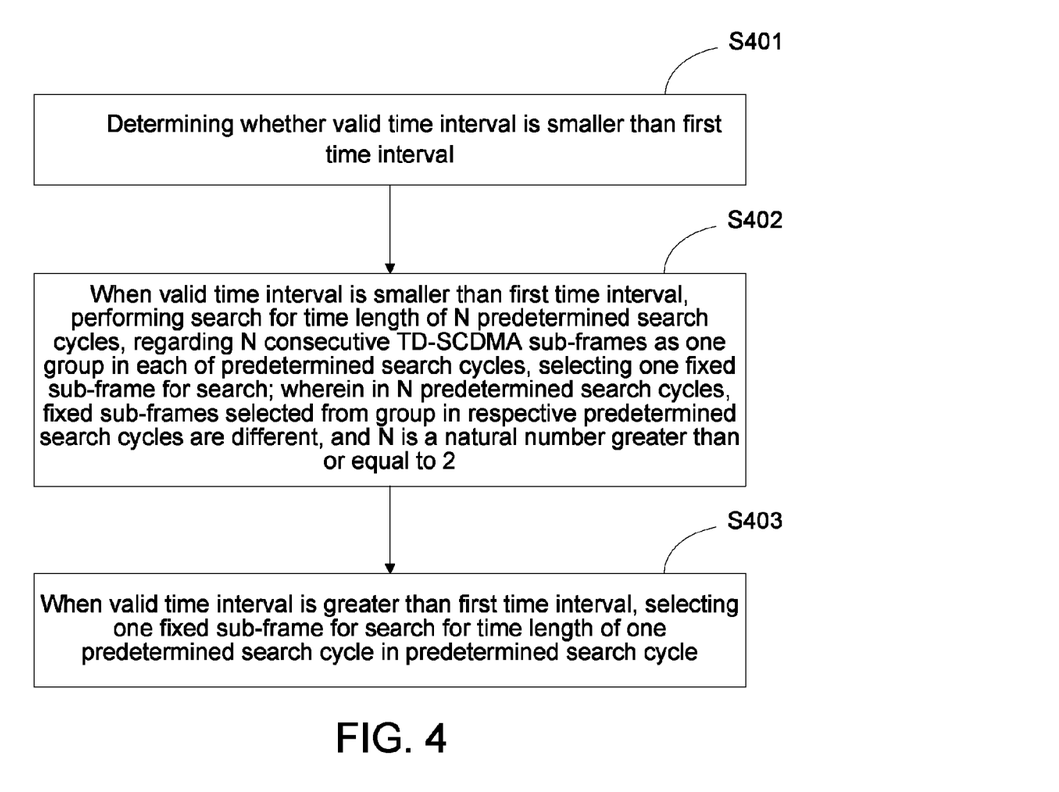
FIG. 4 is a flowchart of a scheduling method according to another embodiment of the present invention.

FIG. 4 shows a flowchart of a scheduling method according to another embodiment of the present invention. In the embodiment, a UE of TD-SCDMA system scheduling GSM measurement is described as an example for illustrating the present invention. The scheduling method according to the embodiment includes following steps.

This embodiment is similar to the previous embodiment, with a difference being step S402. Step S401 is identical to step S301 of the previous embodiment. Details of step S401 can be referred from the description associated with step S301, and shall be omitted herein.

In step S402, when the valid time interval is smaller than the first time interval, a search is performed for a time length of N predetermined search cycles. In each of the predetermined search cycles, N consecutive TD-SCDMA sub-frames are regarded as one group, and a fixed sub-frame is selected from the group for the search. Further, in the N predetermined search cycles, the fixed sub-frames selected from the group in the respective predetermined search cycles are different. N is a natural number greater than or equal to 2.

When the valid time interval for the GSM measurement is smaller than the first time interval, the UE performs the search for a time length of N predetermined search cycles. In the $1^{st}$ predetermined search cycle, the $1^{st}$ sub-frame of the N consecutive TD-SCDMA sub-frames in the group is selected for scheduling to search for the FCCH or SCH information; in the $2^{nd}$ predetermined search cycle, the $2^{nd}$ sub-frame of the N consecutive TD-SCDMA sub-frames in the group is selected for scheduling to search for the FCCH or SCH information; and so forth. In the $N^{th}$ predetermined search cycle, the $N^{th}$ sub-frame of the N consecutive TD-SCDMA sub-frames in the group is selected for scheduling to search for the FCCH or SCH information, thereby completing the GSM initialization synchronization in the TD-SCMDA mode. Wherein, N is a natural number greater than or equal to 2, and the predetermined search cycle is 660 ms or an integral multiple of 660 ms.

Figure 5:
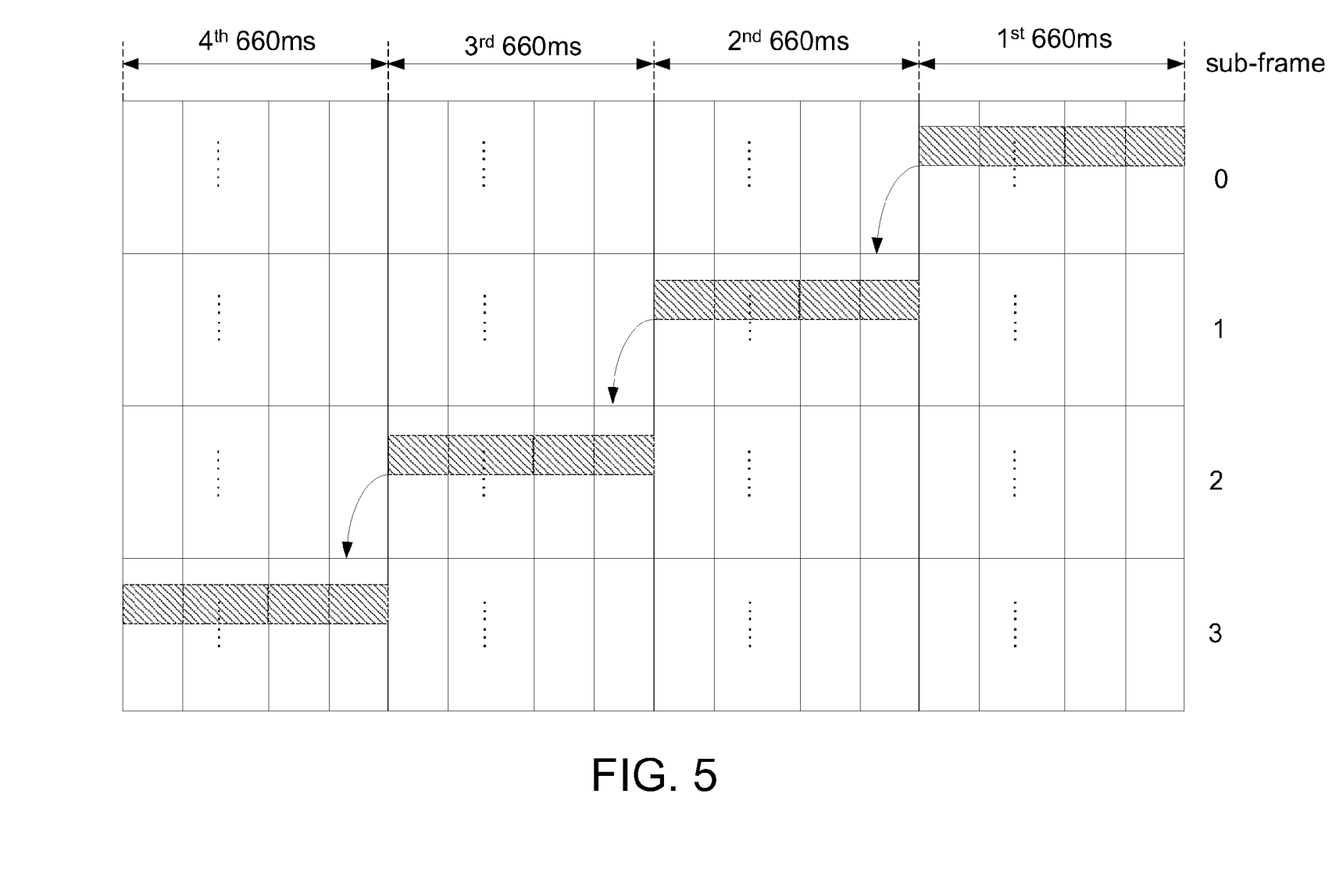
FIG. 5 is a schematic diagram of a scheduling method according to an embodiment of the present invention.
Figure 6:
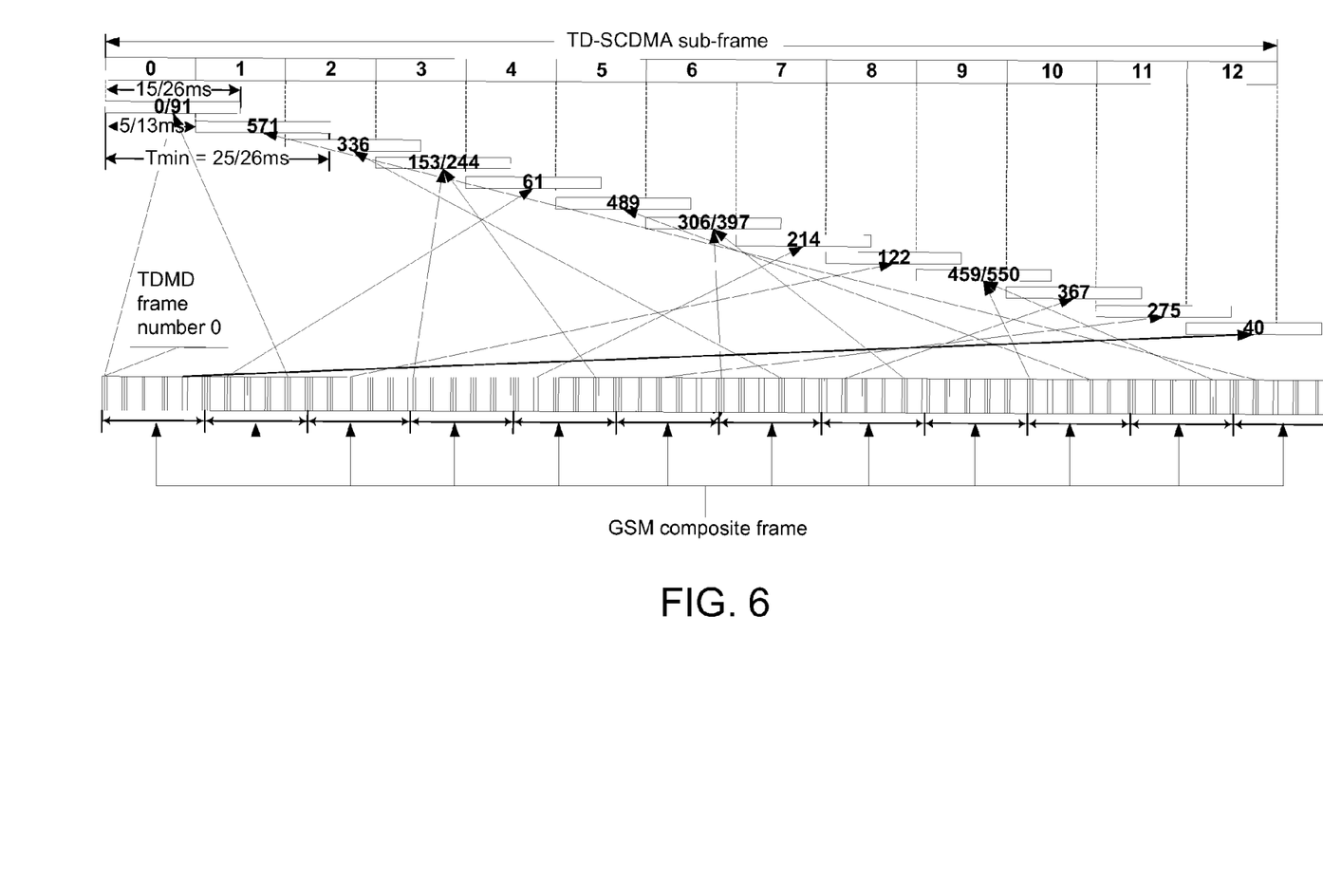
FIG. 6 is a schematic diagram of searching for FCCH/SCH information by adopting the measurement method in FIG. 5.

FIG. 5 is a schematic diagram of a scheduling method according to an embodiment of the present invention. FIG. 6 is a schematic diagram of searching for FCCH/SCH information by adopting the measuring method in FIG. 5. Referring to FIG. 5 and FIG. 6, in the embodiment, a UE of TD-SCDMA system scheduling GSM measurement is described as an example for illustrating the present invention.

According to current protocols, as the length of each TD-SCMDA sub-frame is 5 ms and the length of one GSM TDMA frame is 60/13 ms, the position of the FCCH/SCH information of each GSM TDMA frame relative to the position of one TD-SCDMA sub-frame shifts as time passes. After the length of each GSM TDMA frame, the relative position shifts by (5−60/12)ms=5/13 ms, meaning that one 5 ms TD-SCDMA sub-frame has 13 shift positions.

Further, according to current GSM measuring methods, to successfully identify the FCCH or SCH information, the search cycle for the GSM measurement needs to be greater than or equal to 660 ms, and the search range covered by the search cycle needs to completely cover 13 shift positions of one 5 ms TD-SCDMA sub-frames, thereby guaranteeing a successful search for the FCCH or SCH information.

As shown in FIG. 4, in the embodiment, N=4, and the predetermined search cycle is 660 ms. The UE performs the search for a time length of 4 predetermined search cycles, regards 4 consecutive TD-SCDMA sub-frames as one group in each of the predetermined search cycles, and selects a fixed sub-frame (the shaded sub-frame) from the group to search for the FCCH or SCH information. In the 4 predetermined search cycles, the fixed sub-frames selected from the group in the respective predetermined search cycles are different.

After the UE performs the search for a time length of 4 predetermined search cycles (660 ms*4=2640 ms), it is ascertained that the search range covers the 13 shift positions of one TD-SCDMA sub-frame shown in FIG. 6, thereby guaranteeing a successful search for the FCCH or SCH information and thus implementing the GSM initialization synchronization in the TD-SCDMA mode.

For example, the UE performs a search for a time length of 4 predetermined search cycles, and selects the $1^{st}$ sub-frame (the shaded sub-frame) of the 4 consecutive TD-SCDMA sub-frames in the group in the $1^{st}$ 660 ms predetermined search cycle to search for the FCCH or SCH information. In the $1^{st}$ predetermined search cycle, the search range covers positions 0, 12, 3, 7 and 8 of one TD-SCDMA sub-frame, as shown in FIG. 6.

As shown in FIG. 6, in the $1^{st}$ 660 ms predetermined search cycle, in the GSM composite frame, the $1^{st}$ TDMA frame with a frame number 0 carrying the FCCH/SCH information appears at the position 0 in the TD-SCDMA sub-frame, the $2^{nd}$ TDMA frame with a frame number 40 carrying the FCCH/SCH information appears at the position 12 in the TD-SCDMA sub-frame, the $3^{rd}$ TDMA frame with a frame number 214 carrying the FCCH/SCH information appears at the position 7 in the TD-SCDMA sub-frame, and the $4^{th}$ TDMA frame with a frame number 244 carrying the FCCH/SCH information appears at the position 3 in the TD-SCDMA sub-frame.

In the $2^{nd}$ predetermined search cycle, the $2^{nd}$ sub-frame of the 4 consecutive TD-SCDMA sub-frames in the group is selected for scheduling to search for the FCCH or SCH information. In the $2^{nd}$ 660 ms predetermined search cycle, the search range covers positions 4, 0, 11, 9 and 5 of one TD-SCDMA sub-frame, as shown in FIG. 6.

As shown in FIG. 6, in the $2^{nd}$ 660 ms predetermined search cycle, the $1^{st}$ TDMA frame with a frame number 61 carrying the FCCH/SCH information appears at the position 4 in the TD-SCDMA sub-frame, the $2^{nd}$ TDMA frame with a frame number 91 carrying the FCCH/SCH information appears at the position 0 in the TD-SCDMA sub-frame, the $3^{rd}$ TDMA frame with a frame number 275 carrying the FCCH/SCH information appears at the position 11 in the TD-SCDMA sub-frame, the $4^{th}$ TDMA frame with a frame number 459 carrying the FCCH/SCH information appears at the position 9 in the TD-SCDMA sub-frame, and the $5^{th}$ TDMA frame with a frame number 489 carrying the FCCH/SCH information appears at the position 5 in the TD-SCDMA sub-frame In the $3^{rd}$ predetermined search cycle, the $3^{rd}$ sub-frame of the 4 consecutive TD-SCDMA sub-frames in the group is selected for scheduling to search for the FCCH or SCH information. In the $3^{rd}$ 660 ms predetermined search cycle, the search range covers positions 8, 6, 2 and 9 of one TD-SCDMA sub-frame, as shown in FIG. 6.

As shown in FIG. 6, in the $3^{rd}$ 660 ms predetermined search cycle, the $1^{st}$ TDMA frame with a frame number 122 carrying the FCCH/SCH information appears at the position 8 in the TD-SCDMA sub-frame, the $2^{nd}$ TDMA frame with a frame number 306 carrying the FCCH/SCH information appears at the position 6 in the TD-SCDMA sub-frame, the $3^{rd}$ TDMA frame with a frame number 336 carrying the FCCH/SCH information appears at the position 2 in the TD-SCDMA sub-frame, and the $4^{th}$ TDMA frame with a frame number 550 carrying the FCCH/SCH information appears at the position 9 in the TD-SCDMA sub-frame.

In the $4^{th}$ predetermined search cycle, the $4^{th}$ sub-frame of the 4 consecutive TD-SCDMA sub-frames in the group is selected for scheduling to search for the FCCH or SCH information. In the $4^{th}$ 660 ms predetermined search cycle, the search range covers positions 3, 10, 6 and 1 of one TD-SCDMA sub-frame, as shown in FIG. 6.

As shown in FIG. 6, in the $4^{th}$ 660 ms predetermined search cycle, the $1^{st}$ TDMA frame with a frame number 153 carrying the FCCH/SCH information appears at the position 3 in the TD-SCDMA sub-frame, the $2^{nd}$ TDMA frame with a frame number 367 carrying the FCCH/SCH information appears at the position 10 in the TD-SCDMA sub-frame, the $3^{rd}$ TDMA frame with a frame number 397 carrying the FCCH/SCH information appears at the position 6 in the TD-SCDMA sub-frame, and the $4^{th}$ TDMA frame with a frame number 571 carrying the FCCH/SCH information appears at the position 1 in the TD-SCDMA sub-frame.

The scheduling method of the embodiment may selectively include step S403. In step S403, when the valid time interval is greater than the first time interval, a fixed sub-frame is selected to perform the search for a time length of one predetermined search cycle in the predetermined search cycle.

When the valid time interval is greater than the first time interval, the UE uses a time length of one predetermined interval as the current GSM measuring method to select one fixed sub-frame in the predetermined search cycle to perform the search.

In the embodiment, the method for searching for the FCCH/SCH information implementing the GSM initialization synchronization in the TD-SCDMA mode may be further applied to measurement of the TD-SCDMA system, measurement of 2G heterogeneous systems, and scheduling of 2G FCCH/SCH search cycles to achieve optimal system performance.

Figure 7:
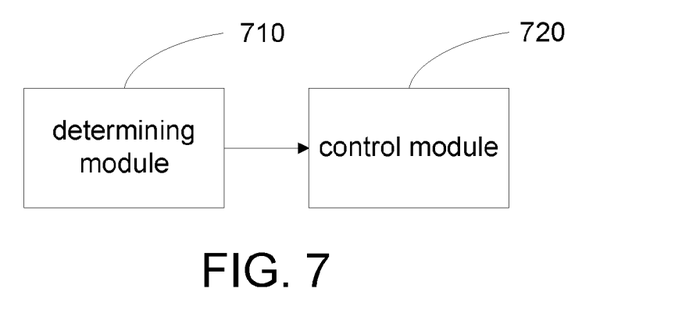
FIG. 7 is a schematic diagram of a scheduling device according to an embodiment of the present invention.

FIG. 7 shows a schematic diagram of a scheduling device according to an embodiment of the present invention. In the embodiment, a UE of TD-SCDMA system scheduling GSM measurement is described as an example for illustrating the present invention.

In the embodiment, the scheduling device includes a determining module 710 and a control module 720.

According to current GSM measuring methods, in order implement GSM initialization synchronization in a TD-SCDMA mode for a UE, it needs to be ensured that the time interval for GSM measurement is greater than or equal to 25/26 ms and the search cycle is greater than or equal to 660 ms. As such, it can then be ascertained that the search cycle completely covers 13 shift positions of one 5 ms TD-SCDMA sub-frame to further guarantee a successful search for the FFCH information or the SCH information.

The determining module 710 determines whether a valid time interval is smaller than a first time interval. The first time interval is at least a sum of a difference between a length of one TD-SCDMA sub-frame and a length of one TDMA frame and a length of a GSM timeslot.

For example, in a TD-SCDMA mode, the determining module 710 determines whether a valid time interval is smaller than a first time interval. The first time interval is at least a sum of a difference between a length of one TD-SCDMA sub-frame and a length of one TDMA frame and a length of a GSM timeslot. In the embodiment, the first time interval is at least 25/26 ms=5 ms−60/13 ms+15/26 ms. The determining module 710 further sends the determination result to the control module 720.

The control module 720 receives the determination result. When the valid time interval is smaller than the first time interval, the control module 720 performs a search for a time length of N predetermined search cycles, regards N consecutive TD-SCDMA sub-frames as one group in each of the predetermined search cycles, and selects a fixed sub-frame from the group to search for the FCCH or SCH information. In the N predetermined search cycles, the fixed sub-frames selected from the group in the respective predetermined search cycles are different. N is a natural number greater than or equal to 2.

For example, when the valid time interval for the GSM measurement is smaller than the first time interval, the control module 720 performs a search for a time length of N predetermined search cycles, regards N consecutive TD-SCDMA sub-frames as one group in each of the predetermined search cycles, and selects a fixed sub-frame from the group to search for the FCCH or SCH information. Further, in the N predetermined search cycles, the fixed frames selected from the group in the respectively predetermined search cycles are different, thereby completing the GSM initialization synchronization in the TD-SCDMA mode. Wherein, N is greater than or equal to 2, and the predetermined search cycle is 660 ms or an integral multiple of 660 ms.

Selectively, when the actual value time interval is smaller than the first time interval, in the $1^{st}$ predetermined search cycle, the control module 720 selects the $1^{st}$ sub-frame in the group for scheduling to search for the FCCH or SCH information; in the $2^{nd}$ predetermined search cycle, the control module 720 selects the $2^{nd}$ sub-frame in the group for scheduling to search for the FCCH or SCH information; and so forth. In the $N^{th}$ predetermined search cycle, the control module 720 selects the $N^{th}$ sub-frame in the group for scheduling to search for the FCCH or SCH information.

For example, when the valid time interval for the GSM measurement is smaller than the first time interval, the control module 720 performs a search for a time length of N predetermined search cycles. In the $1^{st}$ predetermined search cycle, the control module 720 selects the $1^{st}$ sub-frame of the N consecutive TD-SCDMA sub-frames in the group for scheduling to search for the FCCH or SCH information; in the $2^{nd}$ predetermined search cycle, the control module 720 selects the $2^{nd}$ sub-frame of the N consecutive TD-SCDMA sub-frames the group for scheduling to search for the FCCH or SCH information; and so forth. In the $N^{th}$ predetermined search cycle, the control module 720 selects the $N^{th}$ sub-frame of the N consecutive TD-SCDMA sub-frames in the group for scheduling to search for the FCCH or SCH information, thereby completing the GSM initialization synchronization in the TD-SCDMA mode. Wherein, N is a natural number greater than or equal to 2, and the predetermined search cycle is 660 ms or an integral multiple of 660 ms.

More specifically, referring to FIG. 5 and FIG. 6, FIG. 5 is a schematic diagram of a scheduling method according to an embodiment of the present invention, and FIG. 6 is a schematic diagram of searching for FCCH/SCH information by adopting the measuring method in FIG. 5. In the embodiment, a UE of TD-SCDMA system scheduling GSM measurement is described as an example for illustrating the present invention.

According to current protocols, as the length of each TD-SCMDA sub-frame is 5 ms and one GSM TDMA frame is 60/13 ms, the position of the FCCH/SCH information of each GSM TDMA frame relative to the position of one TD-SCDMA sub-frame shifts as time passes. After the length of each GSM TDMA frame, the relative position shifts by (5−60/12)ms=5/13 ms, meaning that one 5 ms TD-SCDMA sub-frame has 13 shift positions.

Further, according to current GSM measuring methods, to allow the control module 720 with a successful search for FCCH or SCH information, the search cycle for the GSM measurement needs to be greater than or equal to 660 ms, and the search range covered by the search cycle needs to completely cover 13 shift positions of one 5 ms TD-SCDMA sub-frames, thereby guaranteeing a successful search for the FCCH or SCH information.

As shown in FIG. 4, in the embodiment, N=4, and the predetermined search cycle is 660 ms. The control module 720 performs the search for a time length of 4 predetermined search cycles, regards 4 consecutive TD-SCDMA sub-frames as one group in each of the predetermined search cycles, and selects a fixed sub-frame (the shaded sub-frame) from the group to search for the FCCH or SCH information. In the 4 predetermined search cycles, the fixed sub-frames selected from the group in the respective predetermined search cycles are different.

After the control module 720 performs the search for a time length of 4 predetermined search cycles (660 ms*4=2640 ms), it is ascertained that the search range covers the 13 shift positions of one TD-SCDMA sub-frames shown in FIG. 6, thereby guaranteeing a successful search for the FCCH or SCH information and thus implementing the GSM initialization synchronization in the TD-SCDMA mode.

For example, the control module 720 performs a search for a time length of 4 predetermined search cycles, and selects the $1^{st}$ sub-frame (the shaded sub-frame) of the 4 consecutive TD-SCDMA sub-frames in the group in the $1^{st}$ 660 ms predetermined search cycle to search for the FCCH or SCH information. In the $1^{st}$ predetermined search cycle, the search range of the control module 720 covers positions 0, 12, 3, 7 and 8 of one TD-SCDMA sub-frame, as shown in FIG. 6.

As shown in FIG. 6, in the $1^{st}$ 660 ms predetermined search cycle, in the GSM composite frame, the $1^{st}$ TDMA frame with a frame number 0 carrying the FCCH/SCH information appears at the position 0 in the TD-SCDMA sub-frame, the $2^{nd}$ TDMA frame with a frame number 40 carrying the FCCH/SCH information appears at the position 12 in the TD-SCDMA sub-frame, the $3^{rd}$ TDMA frame with a frame number 214 carrying the FCCH/SCH information appears at the position 7 in the TD-SCDMA sub-frame, and the $4^{th}$ TDMA frame with a frame number 244 carrying the FCCH/SCH information appears at the position 3 in the TD-SCDMA sub-frame.

In the $2^{nd}$ predetermined search cycle, the control module 720 selects the $2^{nd}$ sub-frame of the 4 consecutive TD-SCDMA sub-frames in the group for scheduling to search for the FCCH or SCH information. In the $2^{nd}$ 660 ms predetermined search cycle, the search range covers positions 4, 0, 11, 9 and 5 of one TD-SCDMA sub-frame, as shown in FIG. 6.

As shown in FIG. 6, in the $2^{nd}$ 660 ms predetermined search cycle, the $1^{st}$ TDMA frame with a frame number 61 carrying the FCCH/SCH information appears at the position 4 in the TD-SCDMA sub-frame, the $2^{nd}$ TDMA frame with a frame number 91 carrying the FCCH/SCH information appears at the position 0 in the TD-SCDMA sub-frame, the $3^{rd}$ TDMA frame with a frame number 275 carrying the FCCH/SCH information appears at the position 11 in the TD-SCDMA sub-frame, the $4^{th}$ TDMA frame with a frame number 459 carrying the FCCH/SCH information appears at the position 9 in the TD-SCDMA sub-frame, and the $5^{th}$ TDMA frame with a frame number 489 carrying the FCCH/SCH information appears at the position 5 in the TD-SCDMA sub-frame.

In the $3^{rd}$ predetermined search cycle, the control module 720 selects the $3^{rd}$ sub-frame of the 4 consecutive TD-SCDMA sub-frames in the group for scheduling to search for the FCCH or SCH information. In the $3^{rd}$ 660 ms predetermined search cycle, the search range covers positions 8, 6, 2 and 9 of one TD-SCDMA sub-frame, as shown in FIG. 6.

As shown in FIG. 6, in the $3^{rd}$ 660 ms predetermined search cycle, the $1^{st}$ TDMA frame with a frame number 122 carrying the FCCH/SCH information appears at the position 8 in the TD-SCDMA sub-frame, the $2^{nd}$ TDMA frame with a frame number 306 carrying the FCCH/SCH information appears at the position 6 in the TD-SCDMA sub-frame, the $3^{rd}$ TDMA frame with a frame number 336 carrying the FCCH/SCH information appears at the position 2 in the TD-SCDMA sub-frame, and the $4^{th}$ TDMA frame with a frame number 550 carrying the FCCH/SCH information appears at the position 9 in the TD-SCDMA sub-frame.

In the $4^{th}$ predetermined search cycle, the control module 720 selects the $4^{th}$ sub-frame of the 4 consecutive TD-SCDMA sub-frames in the group for scheduling to search for the FCCH or SCH information. In the $4^{th}$ 660 ms predetermined search cycle, the search range covers positions 3, 10, 6 and 1 of one TD-SCDMA sub-frame, as shown in FIG. 6.

As shown in FIG. 6, in the $4^{th}$ 660 ms predetermined search cycle, the $1^{st}$ TDMA frame with a frame number 153 carrying the FCCH/SCH information appears at the position 3 in the TD-SCDMA sub-frame, the $2^{nd}$ TDMA frame with a frame number 367 carrying the FCCH/SCH information appears at the position 10 in the TD-SCDMA sub-frame, the $3^{rd}$ TDMA frame with a frame number 397 carrying the FCCH/SCH information appears at the position 6 in the TD-SCDMA sub-frame, and the $4^{th}$ TDMA frame with a frame number 571 carrying the FCCH/SCH information appears at the position 1 in the TD-SCDMA sub-frame.

Further, when the valid time interval is greater than the first time interval, the control module 720 selects a fixed sub-frame in the predetermined search cycle to perform the search for a time length of one predetermined search cycle. For example, when the valid time interval is greater than the first time interval, the control module 720 uses a time length of one predetermined interval as the current GSM measuring method to select one fixed sub-frame in the predetermined search cycle to perform the search.

In the embodiment, the method for searching the FCCH/SCH information to implement the GSM initialization synchronization in the TD-SCDMA mode may be further applied to measurement of the TD-SCDMA system, measurement of 2G heterogeneous systems, and scheduling of 2G FCCH/SCH search cycles to achieve optimal system performance.

In the present invention, by employing the repetition property in the structure of TD-SCDMA frames, it is determined whether the valid time interval is smaller than the first time interval at the fixed position. When the valid time interval is smaller than the first time interval at the fixed position, N consecutive TD-SCDMA sub-frames in a predetermined search cycle are regarded as one group, and N different fixed sub-frames are selected in the respectively N predetermined search cycles for scheduling to search for the FCCH or SCH information. Thus, a successful search for the FCCH or SCH information is implemented without involving successive uses of TD-SCDMA sub-frames to complete GSM initialization synchronization and to further satisfy scheduling time requirements of the standard for different tasks.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scheduling method for a user equipment, comprising:
   determining whether a valid time interval is smaller than a first time interval, the first time interval at least being a sum of a first value and a length of a Global System of Mobile communication (GSM) timeslot, wherein said first value is a difference between a length of one Time Division-Synchronous Code Division Multiple Access (TD-SCDMA) sub-frame and a length of one Time Division Multiple Access (TDMA) frame; and when the valid time interval is smaller than the first time interval, performing a search for a time length of N predetermined search cycles, N consecutive TD-SCDMA sub-frames being regarded as one group in each of the predetermined search cycles, selecting a fixed sub-frame in the group for the search and completing a GSM initialization synchronization of said user equipment;

wherein, said user equipment is operating in a TD-SCDMA mode;

wherein, in the N predetermined search cycles, the fixed sub-frames selected in respective predetermined search cycles are different, and N is a natural number greater than or equal to 2.

2. The scheduling method according to claim 1, wherein the predetermined search cycle is 660 ms or an integral multiple of 660 ms.

3. The scheduling method according to claim 1, wherein the first time interval is at least 25/26 ms.

4. The scheduling method according to claim 1, wherein when the valid time interval is greater than the first time interval, a fixed sub-frame is selected in the predetermined search cycle for the search for a time length of one predetermined search interval.

5. The scheduling method according to claim 1, wherein when the valid time interval is smaller than the first time interval, the step of, when the valid time interval is smaller than the first time interval, performing the search for the time length of the N predetermined search cycles, the N consecutive TD-SCDMA sub-frames being regarded as one group in each of the predetermined search cycle, and selecting the fixed sub-frame in the group for the search, comprises:

in a $1^{st}$ predetermined search cycle, selecting a $1^{st}$ sub-frame for scheduling to search for Frequency Correction Channel (FCCH) or Synchronization Channel (SCH) information;

in a $2^{nd}$ predetermined search cycle, selecting a $2^{nd}$ sub-frame for scheduling to search for the FCCH or SCH information; and in an $N^{th}$ predetermined search cycle, selecting an $N^{th}$ sub-frame for scheduling to search for the FCCH or SCH information.

6. A scheduling device, comprising:

a user equipment, comprising a determining module and a control module;

wherein, the determining module determines whether a valid time interval is smaller than a first time interval, the first time interval at least being a sum of a first value and a length of a Global System of Mobile communication (GSM) timeslot, wherein said first value is a difference between a length of one Time Division-Synchronous Code Division Multiple Access (TD-SCDMA) sub-frame and a length of one Time Division Multiple Access (TDMA) frame, the determining module further sends the determination result to the control module;

when the valid time interval is smaller than the first time interval, the control module performs a search for a time length of N predetermined search cycles, regards N consecutive TD-SCDMA sub-frames as one group in each of the predetermined search cycles, selects a fixed sub-frame in the group for the search, and completes a GSM initialization synchronization of said user equipment; and in the N predetermined search cycles, the fixed sub-frames selected in respective predetermined search cycles are different, and N is a natural number greater than or equal to 2;

wherein, said user equipment is operating in a TD-SCDMA mode, and said user equipment further comprises a processor and a non-transitory storage medium; and wherein, said determining module and said control module are stored in said non-transitory storage medium and executed by said processor.

7. The scheduling device according to claim 6, wherein the predetermined search cycle is 660 ms or an integral multiple of 660 ms.

8. The scheduling device according to claim 6, wherein the first time interval is at least 25/26 ms.

9. The scheduling device according to claim 6, wherein when the valid time interval is greater than the first time interval, the control module further selects a fixed sub-frame in the predetermined search cycle for the search for a time length of one predetermined search interval.

10. The scheduling device according to claim 6, wherein when the valid time interval is smaller than the first time interval, in a $1^{st}$ predetermined search cycle, the control module selects a $1^{st}$ sub-frame for scheduling to search for Frequency Correction Channel (FCCH) or Synchronization Channel (SCH) information;

in a $2^{nd}$ predetermined search cycle, the control module selects a $2^{nd}$ sub-frame for scheduling to search for the FCCH or SCH information; and in an $N^{th}$ predetermined search cycle, the control module selects an $N^{th}$ sub-frame for scheduling to search for the FCCH or SCH information.

\* \* \* \* \*